United States Patent
Lim et al.

(10) Patent No.: US 9,298,267 B2
(45) Date of Patent: Mar. 29, 2016

(54) METHOD AND TERMINAL DEVICE FOR CONTROLLING CONTENT BY SENSING HEAD GESTURE AND HAND GESTURE, AND COMPUTER-READABLE RECORDING MEDIUM

(75) Inventors: Chang Joo Lim, Seoul (KR); Yun Guen Jeong, Seoul (KR); Young Sam Min, Seoul (KR); Seung Goo Park, Seoul (KR)

(73) Assignees: Media Interactive Inc., Seoul (KR); The DNA Co., Ltd., Seoul (KR)

( * ) Notice: Subject to any disclaimer, the term of this patent is extended or adjusted under 35 U.S.C. 154(b) by 118 days.

(21) Appl. No.: 14/131,533

(22) PCT Filed: Jul. 9, 2012

(86) PCT No.: PCT/KR2012/005434
§ 371 (c)(1),
(2), (4) Date: Jan. 8, 2014

(87) PCT Pub. No.: WO2013/009062
PCT Pub. Date: Jan. 17, 2013

(65) Prior Publication Data
US 2014/0168074 A1 Jun. 19, 2014

(30) Foreign Application Priority Data
Jul. 8, 2011 (KR) .................. 10-2011-0068076

(51) Int. Cl.
*G06F 3/01* (2006.01)
*G06K 9/00* (2006.01)
*G06K 9/32* (2006.01)

(52) U.S. Cl.
CPC ............ *G06F 3/017* (2013.01); *G06K 9/00355* (2013.01); *G06K 9/3241* (2013.01)

(58) Field of Classification Search
CPC ..... G06F 3/011; G06F 3/012; G06K 9/00355; G06K 9/00375; G06K 9/3241; G06K 9/00006
See application file for complete search history.

(56) References Cited

U.S. PATENT DOCUMENTS

2002/0181773 A1* 12/2002 Higaki ............... G06K 9/00335
382/190
2004/0101192 A1* 5/2004 Yokoyama ............ G06T 7/0042
382/153
2009/0315869 A1* 12/2009 Sugihara ............... G06F 1/1605
345/204

(Continued)

FOREIGN PATENT DOCUMENTS

JP 2009-519105 5/2009
KR 10-2003-0040680 5/2003

(Continued)

*Primary Examiner* — Grant Sitta
*Assistant Examiner* — Amen Bogale
(74) *Attorney, Agent, or Firm* — Husch Blackwell LLP (57) ABSTRACT

The present invention relates to a method, a terminal, and a computer-readable medium for controlling content by detecting head and hand gestures. The method for controlling a content by detecting hand gestures and head gestures, includes steps of: (a) detecting a head region and a hand region of a user by analyzing an input image with an object detection technology; (b) tracking the gestures in the head region and the hand region of the user by using a computer vision technology; and (c) allowing the content to be controlled by referring to gestures-combining information including data on the tracked gestures in the head region and the hand region.

23 Claims, 6 Drawing Sheets

(56) References Cited

U.S. PATENT DOCUMENTS

2010/0128112 A1  5/2010 Marti et al.
2011/0102570 A1* 5/2011 Wilf .................. G06F 3/017
                                                348/77
2011/0304541 A1* 12/2011 Dalal ................ G06F 3/017
                                                345/158

FOREIGN PATENT DOCUMENTS

| KR | 10-2010-0027976 | 3/2010 |
| KR | 10-2010-0032699 | 3/2010 |
| KR | 10-2011-0053396 | 5/2011 |

* cited by examiner

FIG.6

METHOD AND TERMINAL DEVICE FOR CONTROLLING CONTENT BY SENSING HEAD GESTURE AND HAND GESTURE, AND COMPUTER-READABLE RECORDING MEDIUM

CROSS REFERENCE TO RELATED APPLICATIONS

This application is a U.S. National Phase Application of International Application PCT Application No. PCT/KR2012/005434 filed on Jul. 9, 2012, which claims the benefit of priority from Korean Patent Application No. 10-2011-0068076 filed on Jul. 8, 2011. The disclosures of International Application PCT Application No. PCT/KR2012/005434 and Korean Patent Application No. 10-2011-0068076 are incorporated herein by reference.

FIELD OF THE INVENTION

The present invention relates to a method, a terminal, and a computer-readable medium for controlling content by detecting head and hand gestures; and more particularly, to the method, the terminal, and the computer-readable medium for controlling a content by analyzing an input image to detect a head region and a hand region, tracking the head region and the hand region with a computer vision technology, and then using information on the gestures in the head region and the hand region.

BACKGROUND OF THE INVENTION

Recently, devices such as smart TVs and smart phones, which provide contents, have been diversified and even the types of contents provided through them tend to be diversified from movies, music and games to education, medical care and home shopping.

As conventional interface methods for controlling contents, methods for using a tool such as mouse, keyboard, remote controller, etc. connected to the devices that provide contents in a wired or wireless way may be considered. According to such methods, users should accept inconvenience to specify and control every piece of content by using tools. As the misuse of such tools might frequently occur, such methods might cause users to control content difficulty and to keep and manage such tools separately. In addition, in case of a content that emphasizes reality such as 3D games, when users intend to control the content by using such tools, users cannot feel reality from the content.

To overcome the problems of the conventional technology, studies on the methods for controlling a content by using a user's gestures have, been actively conducted, and as the result, a variety of technologies are being developed. As a technology regarding a method for controlling a content by using a user's gestures, there is Korean Laid-Open Publication No. 2011-0053396, which discloses a technology to acquire an image of a hand gesture of the user by using the camera module of a terminal, extract feature points by analyzing the acquired image, detect any movement of the extracted feature points, and then execute a specific function of the terminal after recognizing a specific gesture.

As the aforementioned technology controls the terminal by recognizing hand gestures, the types of gestures which can be recognized in the terminal, however, are limited and it is not easy to control the content effectively with the user's simple gestures. Therefore, it has a limit to enjoy realistic content. Accordingly, the applicant comes to develop a technology to increase the rate of participation of users in the content and to allow more accurate and more realistic content to be enjoyed by making the content be controlled in an extremely convenient and various way by using gestures-combining information which combines the information on locations and directions included in data on the gestures in a head region and a hand region.

SUMMARY OF THE INVENTION

It is an object of the present invention to solve all the problems mentioned above.

It is further an object of the present invention to control a content by analyzing an input image to detect a head region and a hand region, tracking the head region and the hand region with a computer vision technology, and then using information on the gestures in the head region and the hand region.

In accordance with one aspect of the present invention, there is provided a method for controlling a content by detecting hand gestures and head gestures, including steps of:

(a) detecting a head region and a hand region of a user by analyzing an input image with an object detection technology;

(b) tracking the gestures in the head region and the hand region of the user by using a computer vision technology; and (c) allowing the content to be controlled by referring to gestures-combining information including data on the tracked gestures in the head region and the hand region.

In accordance with one aspect of the present invention, there is provided a terminal for controlling a content by detecting hand gestures and head gestures, including: an effective region detecting part for detecting a head region and a hand region of a user by analyzing an input image in use of an object detection technology; a detected region tracking part for tracking gestures in the head region and the hand region of the user by using a computer vision technology; and a control command interpreting part for allowing the content to be controlled by referring to gestures-combining information including data on the tracked gestures in the head region and the hand region.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
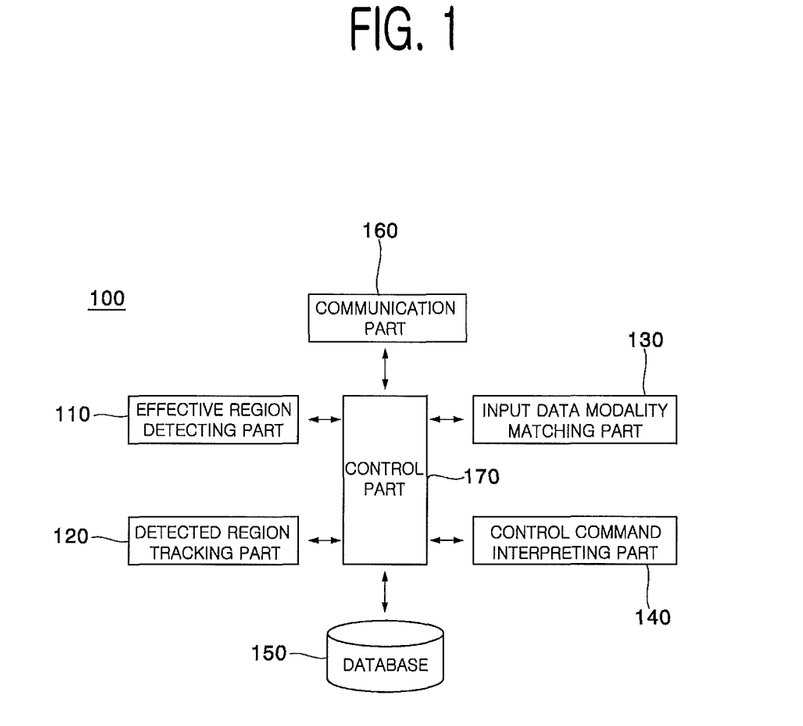
FIG. 1 is a drawing exemplarily showing a configuration of a terminal 100 in accordance with an example embodiment of the present invention.

To allow those skilled in the art to the present invention to be carried out easily, the example embodiments of the present invention by referring to attached diagrams will be explained in detail as follows:

FIG. 1 is a drawing exemplarily showing a configuration of a terminal 100 in accordance with an example embodiment of the present invention.

By referring to FIG. 1, the terminal 100 in accordance with an example embodiment of the present invention may include an effective region detecting part 110, a detected region tracking part 120, an input data modality matching part 130, a control command interpreting part 140, database 150, a communication part 160, and a control part 170. In accordance with an example embodiment of the present invention, an effective region detecting part 110, the detected region tracking part 120, the input data modality matching part 130, the control command interpreting part 140, the database 150, the communication part 160, and the control part 170 may be communicable program modules. Such program modules may be included in the terminal 100 in a form of an operating system, an application program module and other program modules or physically stored in various storage devices well known to those skilled in the art. In addition, they may be stored in a remote storage device capable of communicating with the terminal 100. The program modules may include but not be subject to a routine, a subroutine, a program, an object, a component, and a data structure for executing a specific operation or a type of specific abstract data that will be described in accordance with the present invention.

In accordance with one example embodiment of the present invention, the effective region detecting part 110 detects an effective region, i.e., a head region and a hand region, from an input image by using an object detection technology. For example, the effective region detecting part 110 may detect the head region and the hand region of the user by analyzing the input image of the user based on a skin color model. The image of the user may be in a form of RGB (red, green, and blue) acquired by an RGB camera (non-illustrated in FIG. 1). If the image of the user is in the form of RGB, the effective region detecting part 110 may detect the head region and the hand region after converting the input image to HSI (hue, saturation, and intensity) color coordinates. As the recognition rate of the head region and the hand region in the image in the form of RGB, which includes a luminance component, is low, it is intended to increase the recognition rate of the head region and the hand region by extracting hue and saturation values without luminance to be less influenced by lighting. The head region and the hand region may be detected separately or together.

As mentioned above, to detect an object included in an image frame, the effective region detecting part 110 should use an object detection technology. As such an object detection technology, Korean Laid-Open Publication Nos. 2003-0040680 and 2010-0032699 and so forth may be referred to (The whole content of the Korean Laid-Open Publications mentioned above should be considered to be integrated herein). The Korean Laid-Open Publications mentioned above describe a method for detecting a facial region and a hand region accurately after converting the image in a form of RGB to the HSI coordinates. Of course, the object detection technology applicable to the present invention is not limited to the technology described to the publications, and would be implemented by applying a variety of examples.

Figure 2:
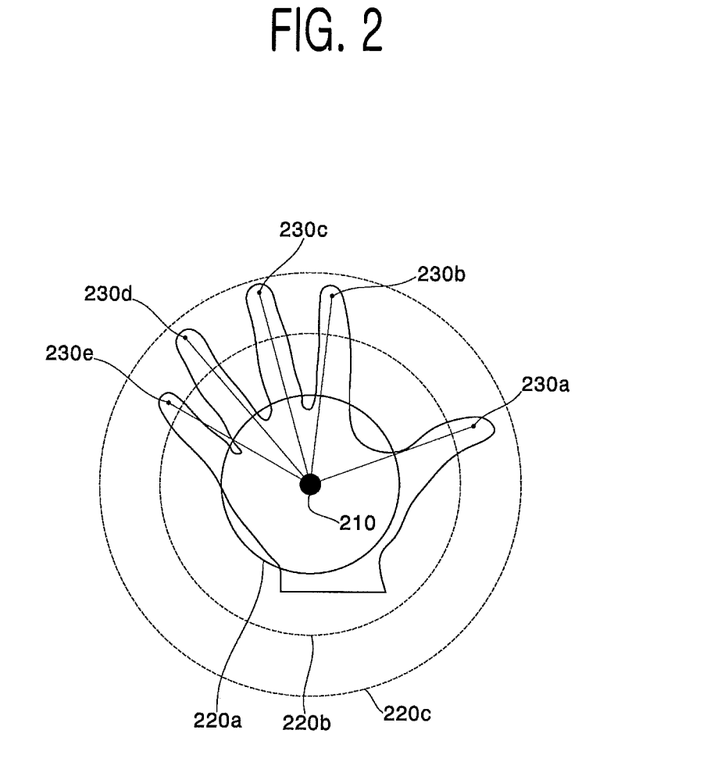
FIG. 2 is a drawing representing a course of a concentric circle being expanded and endpoints 230A through 230E of fingers.

In particular, the effective region detecting part 110 may model a morphological feature of the hands when detecting the hand region, and more specifically, may set a recognition range of the hand region by referring to the pixel values in a concentric circle in center of the central point of a palm of the user while the radius of the concentric circle is increased such that the pixel values in the concentric circle to be matched with the previously-analyzed shape of the hand of the user. The inside of the concentric circle in the matched condition may be the recognition range of detecting where the hand region and the endpoints of fingers are. By referring to FIG. 2, the radius of the concentric 220 may be expanded in the order of 220A, 220B, and 220C such that the radius of the concentric circle 220 acquires information on the locations of endpoints 230A through 230E of fingers of the user. The radius of the concentric circle 220 becomes expanded to acquire information on the endpoints 230A through 230E of all the fingers, but it is not limited to be expanded only at three steps from 220A to 220B and then 220C as shown in FIG. 2. The radius of the concentric circle may be expanded until the information on the endpoints 230A through 230E of all fingers of the user is acquired and it may be limited to a particular value or less to prevent the range of tracking from being expanded to a wrist, a forearm and an arm.

Next, the detected region tracking part 120 tracks gestures in the head region and the hand region of the user detected by the effective region detecting part 110 in use of computer vision technology, which means a technology for tracking the head gestures and the hand gestures of the user only by using the input image without attaching a separate device on the head and the hand of the user. An example of the separate device for tracking the head gestures and the hand gestures of the user may be a headset attached on the head of the user to track the user's head gestures with which information on the user's head gestures is transmitted to a terminal, but the present invention does not require the separate device.

Figure 3:
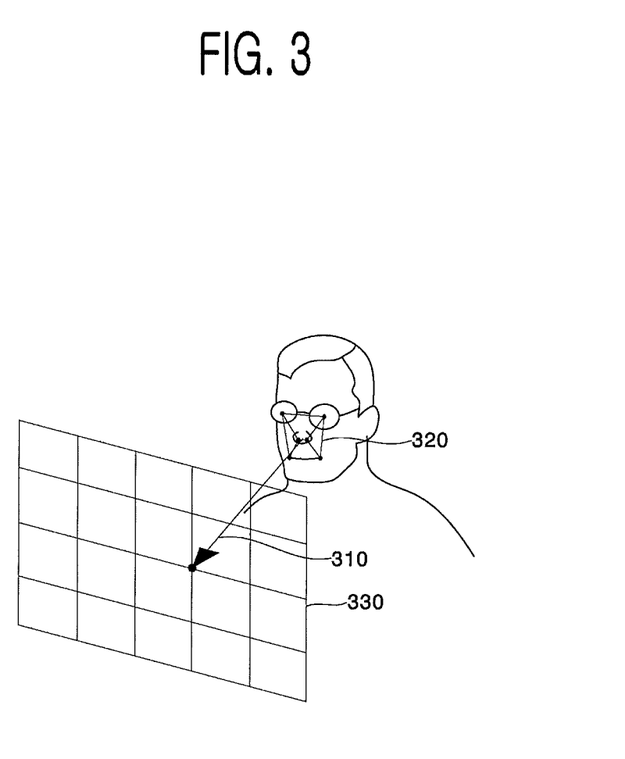
FIG. 3 is a diagram showing that information on gestures in a head region 410 of the user is acquired by using an intersecting point between a sight line 310 of the user and a display 330.

For example, the detected region tracking part 120 may track the gestures in the user's head region by using the user's sight line trajectory. More specifically, by referring to FIGS. 3 and 4, the user's sight line 310 corresponds to a normal vector to a plane 320 of a geometric model formed based on at least multiple morphological feature points extracted from the user's head region 410, which may include at least some of feature points of two eyes, two nostrils and two endpoints of lips on a facial part of the user. In other words, the detected region tracking part 120 may track a movement of the face of the user through the movement of the user's sight line 310, and acquire data on the gestures in the user's head region 410 by storing the tracking data for a predetermined time. The data on the gestures in the user's head region 410 may include information on an absolute coordinate value of an intersecting point when the user's sight line 310 is intersected on the display 330 of the device that provides a content and the time of the user's sight line 310 staying at the intersecting point. Such devices that provide the content may include all types of imaging devices with an operation part that displays the content, e.g., a television, a desktop with a monitor, a laptop, a PDA, a smart phone, a tablet PC, etc.

In addition, the detected region tracking part 120 tracks the gestures in the hand region 420 of the user by referring to a trajectory of at least one moving straight line connecting the central point of the palm of the hand of the user with at least one of the endpoints of the fingers. More specifically, by referring to FIGS. 2 and 4, the trajectory of the at least one moving straight line connecting the central point 210 of the palm and the at least one of the endpoints 230A through 230E of all fingers may be seen as the finger movement. At the time, it may acquire data on the gestures in the hand region 420 of the user by storing the tracking data of the moving straight line for a predetermined time.

Figure 4:
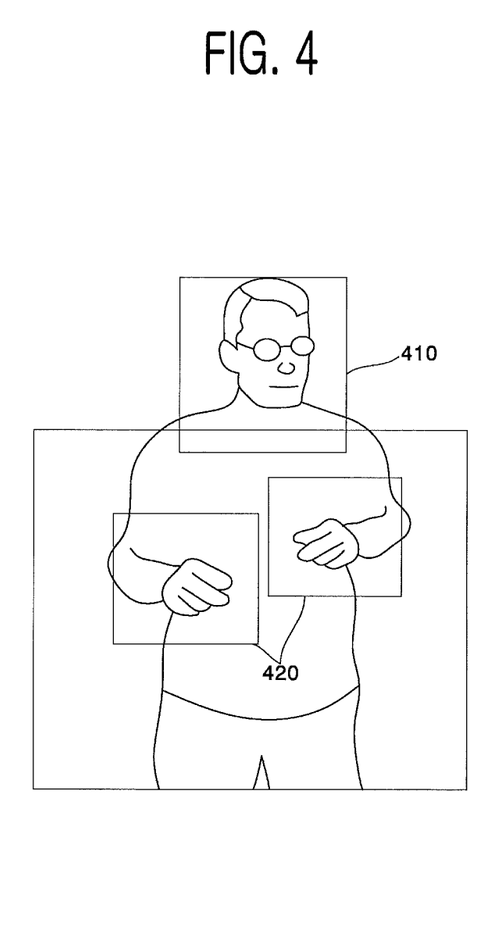
FIG. 4 is a diagram representing a head region 410 and a hand region 420 of the user.

As the data on the gestures in the head region 410 and the hand region 420 of the user may include the information on 3D coordinate values and average movement speed and as the detected region tracking part 120 tracks the gestures in the head region 410 and the hand region 420, respectively, at the time, the data on the gestures in the head region 410 and the hand region 420 may be acquired, respectively. The data on the gestures in the head region 410 and the hand region 420 may be acquired while being tracked separately or together.

Besides, the input data modality matching part 130 may create gestures-combining information by combining the data on the gestures in the head region and those in the hand region acquired by the tracking process of the detected region tracking part 120. Herein, "combining" may include a processing method for displaying images acquired by different kinds of coordinate system through a same coordinate system. More specifically, the input data modality matching part 130 may create gestures-combining information that has the integrated information on the gestures in the head region and the hand region by combining the information on locations and directions included in the data on the gestures in the head region and the hand region after the data are respectively acquired from the detected region tracking part 120.

Next, the control command interpreting part 140 may allow the content to be controlled by the gestures of the head and the hand by referring to the gestures-combining information. The control command interpreting part 140 may perform a function of recognizing gestures-combining information as a specific command to control the content by comparing the information with the command signal data included in the database 150, i.e., a so-called motion dictionary database. In the motion dictionary database 150, at least one piece of command signal data, each of which corresponds to each control command to control the content.

More specifically, if the inputted gestures-combining information corresponds to a prefixed command signal data in the motion dictionary database 150, the control command interpreting part 140 may carry out a function of interpreting the inputted gestures-combining information as a control command corresponding to the prefixed command signal data.

To compare data on the gestures in the head region and the hand region of the user included in the gestures-combining information with command signal data included in the motion dictionary database 150, the movement trajectory of the head region and the hand region of the user, first of all, may be expressed in an autoregressive model by referring to the data on the gestures in the head region and the hand region of the user. Thereafter, a hidden Markov model (HMM) may be applied to the movement trajectory data expressed in the autoregressive model. Finally, the comparison may be made between the command signal data in the motion dictionary database 150 and the data themselves by referring to information on location values and direction values from the gestures-combining information where the HMM is applied. For example, assuming that a control command corresponds to "Move in the direction of X-axis" when the right hand moves from right to left, if signals in the data themselves are compared, the degradation of the recognition rate due to the different moving speed (i.e., slow moving or fast moving speed) could be prevented. As the result of the comparison, the content may be controlled by referring to the command signal data corresponding to the gestures-combining information. Because the present invention may recognize as a control command by combining the gestures in the head region with those in the hand region through the process, the user may control content in intuitive and various forms without using any other tools.

Figure 5:
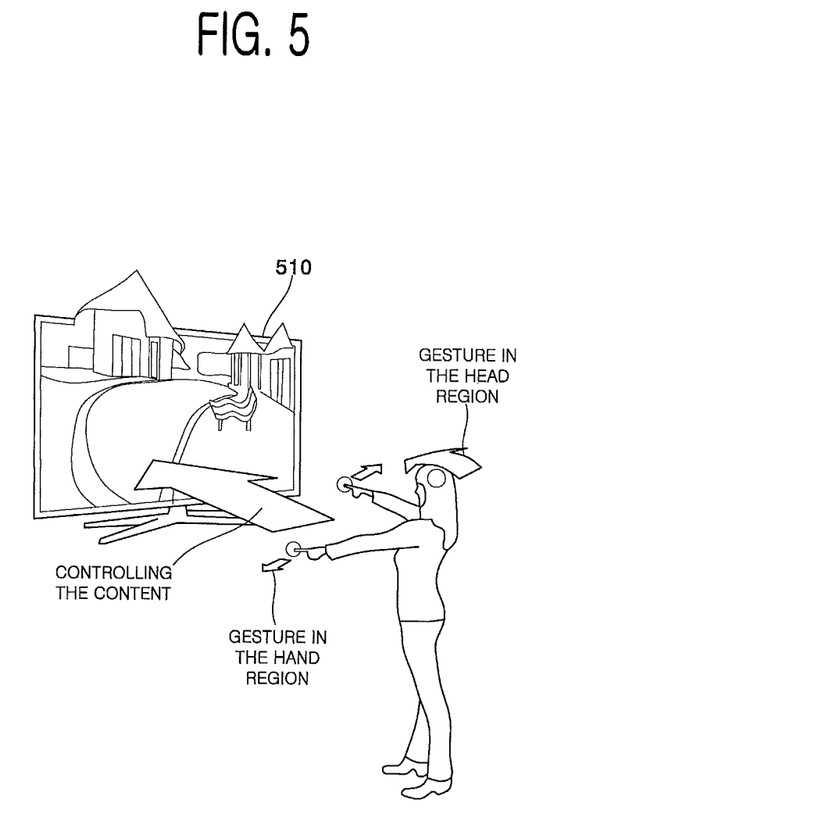
FIG. 5 is a diagram showing that a device 510 provides the user with the content according to gestures in the head region and hand region of the user.

By referring to FIG. 5, when the gestures in the head region and the hand region of the user are taken, a device 510 displays a state where the content is controlled by a control command interpreted by the control command interpreting part 140. FIG. 5 illustrates the scene of the 3D image content being controlled by the gestures in the head region and the hand region of the user.

In accordance with one example embodiment of the present invention, the motion dictionary database 150 is a concept of database not only in a narrow meaning but also in a broad meaning which include data records, etc. based on computer file systems. From the aspect, it must be understood that, if even a set of simple operation processing logs is browsed and data are extracted from the set, it may be included in the database as stated in the present invention. The motion dictionary database 150 in FIG. 1 is illustrated as if it is included in the terminal 100, but the motion dictionary database 150 may be possibly configured separately from the terminal 100 at the necessity of those skilled in the art. In accordance with one example embodiment of the present invention, the communication part 160 may support the terminal 100 to communicate with an external device.

Lastly, the control part 170 in accordance with one example embodiment of the present invention performs a function of controlling data flow among the effective region detecting part 110, the detected region tracking part 120, the input data modality matching part 130, the control command interpreting part 140, the database 150, the communication part 160, and the control part 170. In short the control part 170 in accordance with the present invention controls the flow of data from/to outside or between the component of the terminal 100 and perform the function of controlling the data flow among the effective region detecting part 110, the detected region tracking part 120, the input data modality matching part 130, the control command interpreting part 140, the database 150, the communication part 160, and the control part 170. In other words, it allows each part to perform its unique functions.

Figure 6:
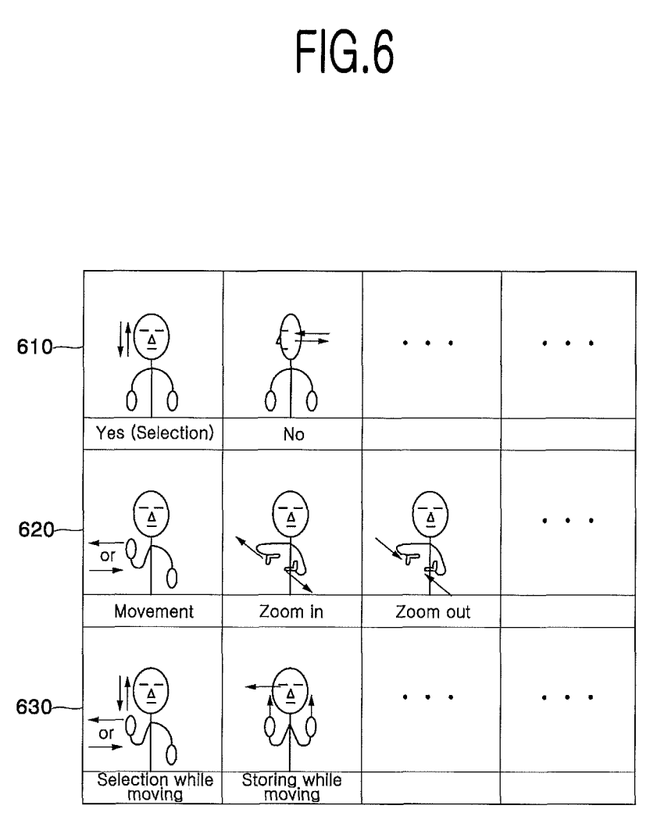
FIG. 6 is a drawing representing at least one piece of command signal data stored in motion dictionary database 150 and a control command corresponding to such command signal data in accordance with one example embodiment.

FIG. 6 is a drawing representing at least one piece of command signal data stored in motion dictionary database 150 and a control command corresponding to such command signal data in accordance with one example embodiment. The example of the command signal data and corresponding control commands may be explained as follows:

For example, nodding the head while stopping gestures of the hand, i.e., a up-and-down movement in the head region, may be recognized as a 'selection' control command to select an image outputted in the display, etc. and moving one hand in a direction of a horizontal axis, i.e., a movement in one hand region in one direction of a horizontal axis, while stopping gestures of the head may be recognized as a 'movement' control command to move images, etc. listed in a direction of the horizontal axis in the display to the direction to which the hand region moves. Nodding the head while moving one hand to a direction of the horizontal axis, i.e., a movement in one hand region in one direction of the horizontal axis and an up-and-down movement in the head region, may be recognized as a 'selection while moving' control command to select an image outputted in the display, etc. while moving the image, etc. to the direction to which the hand region moves. At the time, the control command in combination of the gestures in the head region and the hand region may be recognized by the combination as shown above. By reference, gestures classified differently among the gestures in the hand region may include single-finger, double-finger, single-hand, double-hand, etc.

In accordance with the present invention, content may be extremely effectively controlled by using information on the combination of the user's head and hand gestures without using tools such as keyboard, mouse or remote controller.

In accordance with the present invention, no separate device, e.g., a sensor embedded in a headset, is required to track the head gestures and the hand gestures of the user because the movement of the head and hand of the user is recognized by using the computer vision technology.

In accordance with the present invention, the commands that can control the content may be diversified because the content is controlled by using the gestures-combining information where the information on the location and the direction included in the data on the head gestures and hand gestures is combined.

The embodiments of the present invention as explained above can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention

What is claimed is:

1. A method for controlling a content on an electronic device by detecting hand gestures and head gestures, comprising steps of:
   (a) detecting, via a processor, a head region and a hand region of a user by analyzing an input image from a camera in electronic communication with said processor with an object detection technology;
   (b) tracking the gestures in the head region and the hand region of the user by using a computer vision technology including said camera; and
   (c) allowing the content on the electronic device to be controlled by referring to gestures-combining information including data on the tracked gestures in the head region and the hand region, wherein, at the step (b), data on the gestures are acquired by storing data acquired by tracking, via the camera, a face, a central point of a palm of a hand, and fingers of the user for a predetermined time,
   wherein the step (c) includes the steps of:
   (c4) expressing, via the processor, a movement trajectory in an autoregressive model with reference of the data on the gestures acquired via the camera and stored for the predetermined time;
   (c5) applying, via the processor, a hidden Markov model (HMM) to the movement trajectory data expressed in the autoregressive model; and
   (c6) recognizing, via the processor, the data where the HMM is applied as a special command for controlling the content on the electronic device by comparing the data where the HMM is applied with prefixed command signal data in a motion dictionary database in electronic communication with the processor.

2. The method of claim 1, wherein step (c) includes the step of:
   (c1) combining information on locations and directions included in the data on the gestures in the head region and the hand region.

3. The method of claim 2, wherein the step (c) includes the steps of:
   (c2) recognizing the combined data as a specific command by comparing the combined data with prefixed command signal data in a motion dictionary database; and
   (c3) allowing the content to be controlled according to the recognized specific command.

4. The method of claim 3, wherein, at the step (c2), the command signal data included in the motion dictionary database and the combined data are compared by referring to information on location values and rotation values in the combined data themselves.

5. The method of claim 1, wherein, at the step (a), a recognition range of the hand region is set in order to detect the hand region by referring to pixel values in a concentric circle in center of the central point of a palm of the user while the radius of the concentric circle is increased such that the pixel values in the concentric circle to be matched with the previously-analyzed shape of the hand of the user.

6. The method of claim 5, wherein the radius of the concentric circle is increased until information on the endpoint of each finger is acquired.

7. The method of claim 6, wherein, at the step (b), the gestures in the hand region of the user are tracked by referring to a moving trajectory of at least one straight line that connects the central point of the palm of the user with the endpoint of each finger of the user.

8. The method of claim 1, wherein, at the step (a), the head region and the hand region are detected by analyzing the input image based on a skin color model.

9. The method of claim 1, wherein, at the step (b), the gestures in the head region of the user are tracked by using a trajectory of a sight line of the user, which corresponds to a normal vector to a plane of a geometric model formed based on at least multiple morphological feature points extracted from the user's head region.

10. The method of claim 9, wherein the multiple morphological feature points include feature points of eyes, nostrils, and endpoints of lips on a facial part of the user.

11. The method of claim 9, wherein data on the tracked gestures in the head region include information on an absolute coordinate value of an intersecting point when the normal vector is intersected on a display and the time of staying at the intersecting point.

12. The method of claim 1, wherein the data on the gestures include information on 3D coordinate values and average movement speed.

13. A non-transitory computer readable recording medium with a computer readable program recorded thereon to execute the method of claim 1.

14. A terminal for controlling a content on an electronic device by detecting hand gestures and head gestures, comprising:
    an effective region detecting part executed on a processor for detecting a head region and a hand region of a user by analyzing an input image from a camera in electronic communication with said processor in use of an object detection technology;
    a detected region tracking part executed on the processor for tracking gestures in the head region and the hand region of the user by using a computer vision technology including said camera, wherein the detected region tracking part acquires data on the gestures by storing data acquired by tracking, via the camera, the face, a central point of a palm of a hand, and the fingers of the user for a predetermined time; and
    a control command interpreting part executed on the processor for allowing the content to be controlled on the electronic device by referring to gestures-combining information including data on the tracked gestures acquired via the camera in the head region and the hand region;
    wherein the control command interpreting part expresses a movement trajectory in an autoregressive model with reference of the data on the gestures acquired and stored for the predetermined time, applies a hidden Markov model (HMM) to the movement trajectory data expressed in the autoregressive model, compares the data where the HMM is applied with prefixed command signal data in a motion dictionary database in electronic communication with the processor, and then recognizes the data where the HMM is applied as a special command for controlling the content on the electronic device.

15. The terminal of claim 14, where the control command interpreting part combines information on locations and directions in the data on the gestures in the head region and the hand region, recognizes the combined data as a specific command by comparing the combined data with prefixed command signal data in a motion dictionary database, and then allows the content to be controlled according to the recognized specific command.

16. The terminal of claim 15, wherein command signal data included in the motion dictionary database and the combined data are compared by referring to information on location values and rotation values in the combined data themselves.

17. The terminal of claim 14, wherein a recognition range of the hand region is set in order to detect the hand region by referring to pixel values in a concentric circle in center of the central point of a palm of the user while the radius of the concentric circle is increased such that the pixel values in the concentric circle to be matched with the previously-analyzed shape of the hand of the user.

18. The terminal of claim 17, wherein the radius of the concentric circle is increased until information on the endpoint of each finger is acquired.

19. The terminal of claim 18, wherein the detected region tracking part tracks gestures in the hand region of the user by referring to a moving trajectory of at least one straight line that connects the central point of the palm of the hand of the user with the endpoint of each finger of the user.

20. The terminal of claim 14, wherein the detected region tracking part tracks the gestures in the head region of the user by using a trajectory of a sight line of the user, which corresponds to a normal vector to a plane of a geometric model formed based on at least multiple morphological feature points extracted from the head region of the user.

21. The terminal of claim 20, wherein the multiple morphological feature points include feature points of eyes, nostrils, and endpoints of lips on a facial part of the user.

22. The terminal of claim 20, wherein data on the tracked gestures in the head region include information on an absolute coordinate value of an intersecting point when the normal vector is intersected on a display and the time of staying at the intersecting point.

23. The terminal of claim 14, wherein the data on the gestures include information on 3D coordinate values and average movement speed.

* * * * *